Feb. 15, 1927.
W. L. EVANS
DEVICE FOR MAKING RING JOINTS
Filed Aug. 25 1925 6 Sheets-Sheet 1
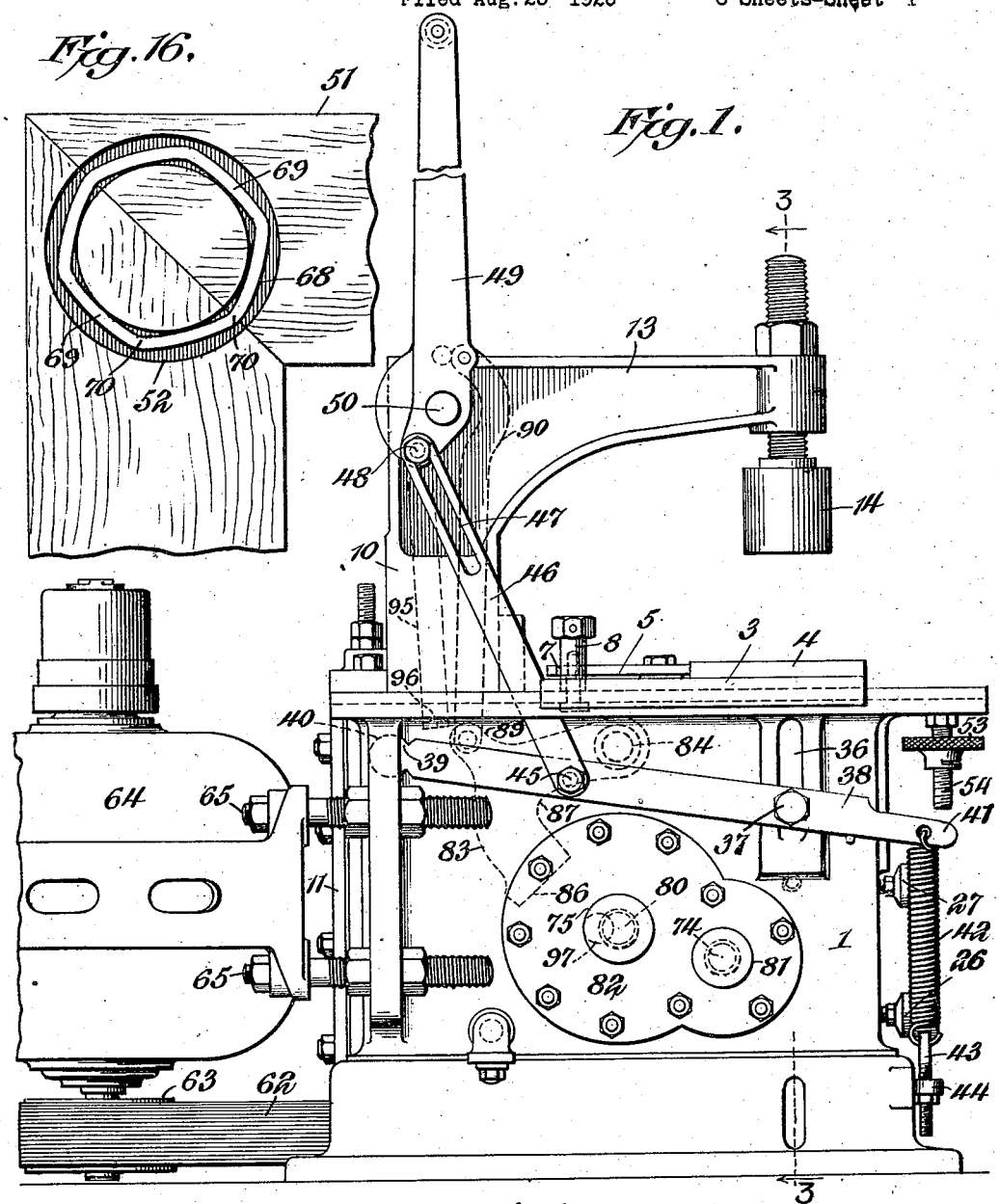
William L. Evans, INVENTOR,
BY *E. G. Siggers*
ATTORNEY
WITNESSES
Howard D. Orr
E. N. Lovewell

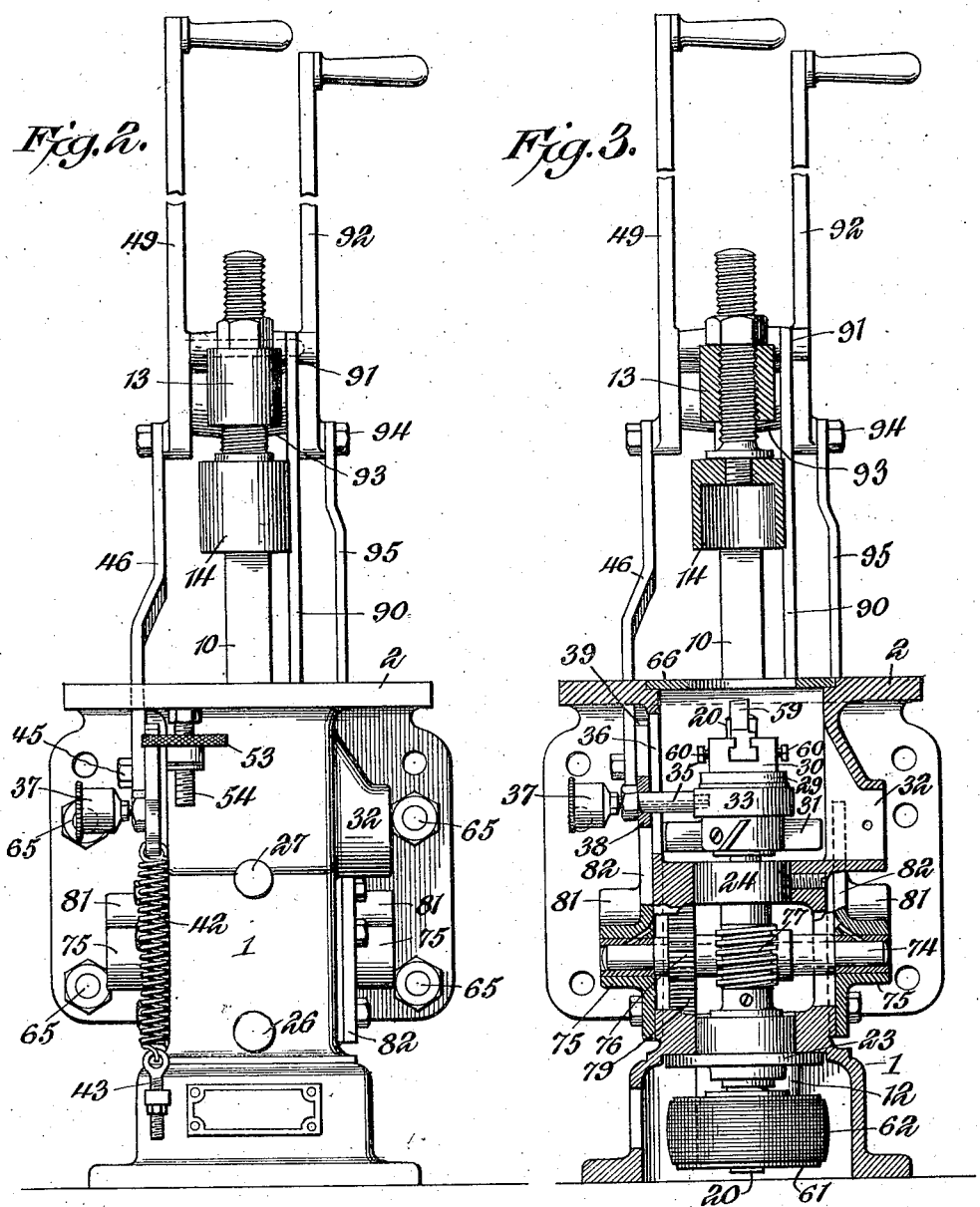

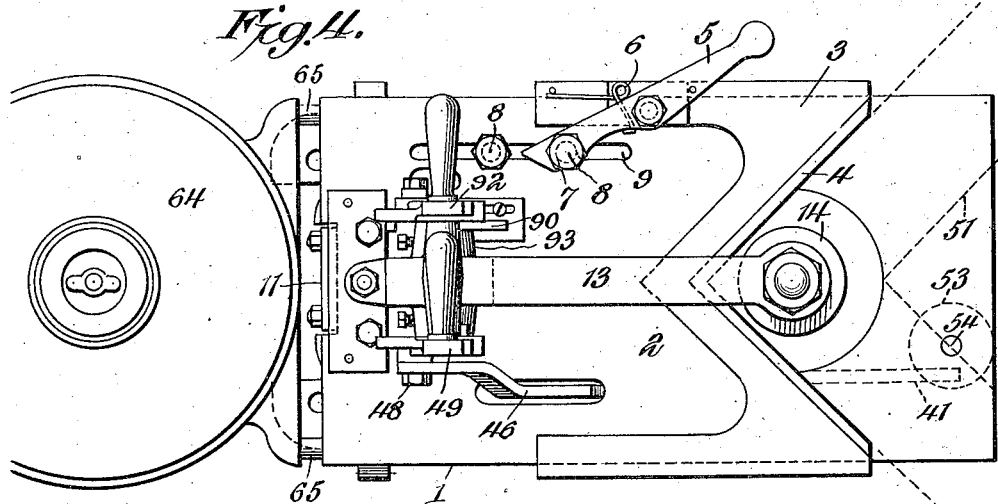
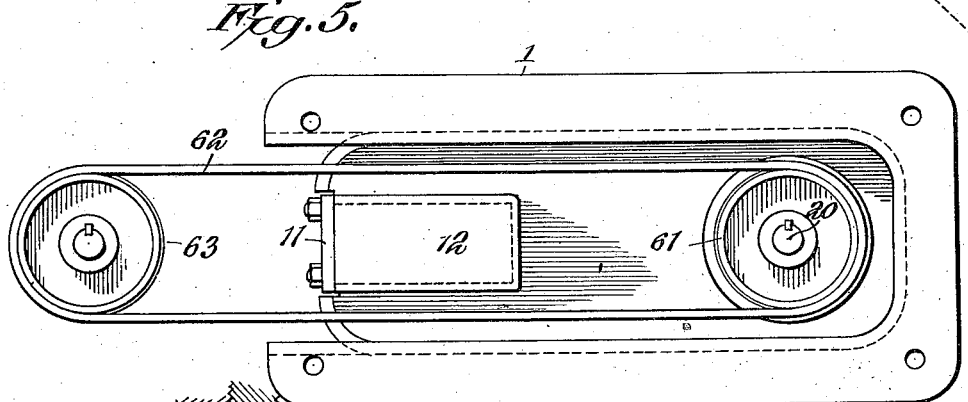
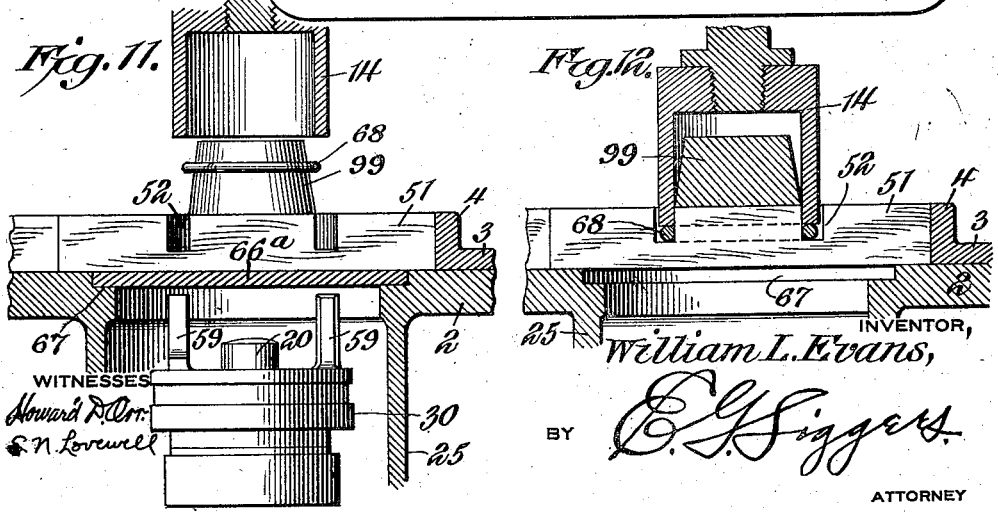

Feb. 15, 1927.
W. L. EVANS
1,617,621
DEVICE FOR MAKING RING JOINTS
Filed Aug. 25 1925    6 Sheets-Sheet 4
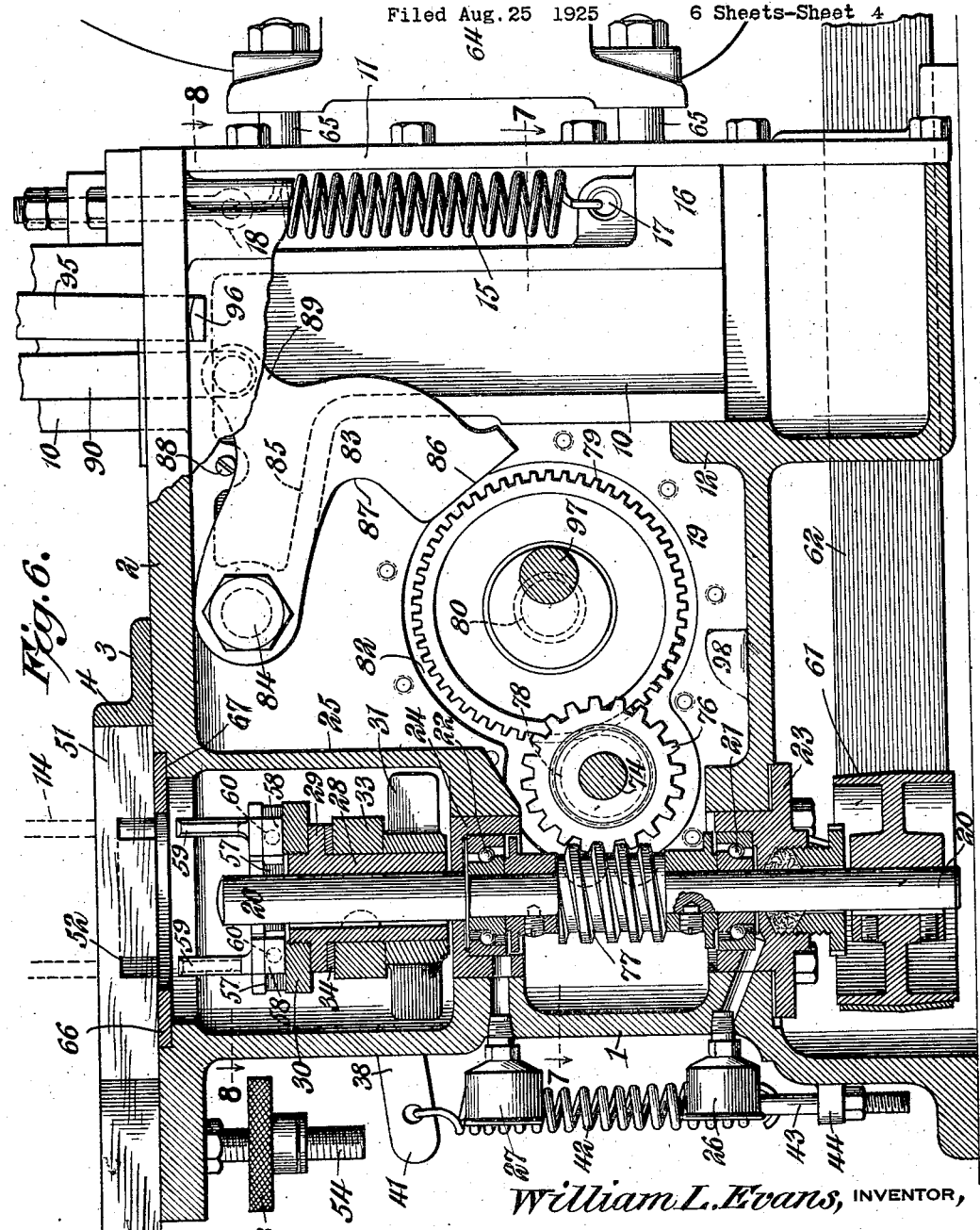
William L. Evans, INVENTOR,
WITNESSES
Howard D. Orr.
E. N. Lovewell
BY E. G. Siggers.
ATTORNEY

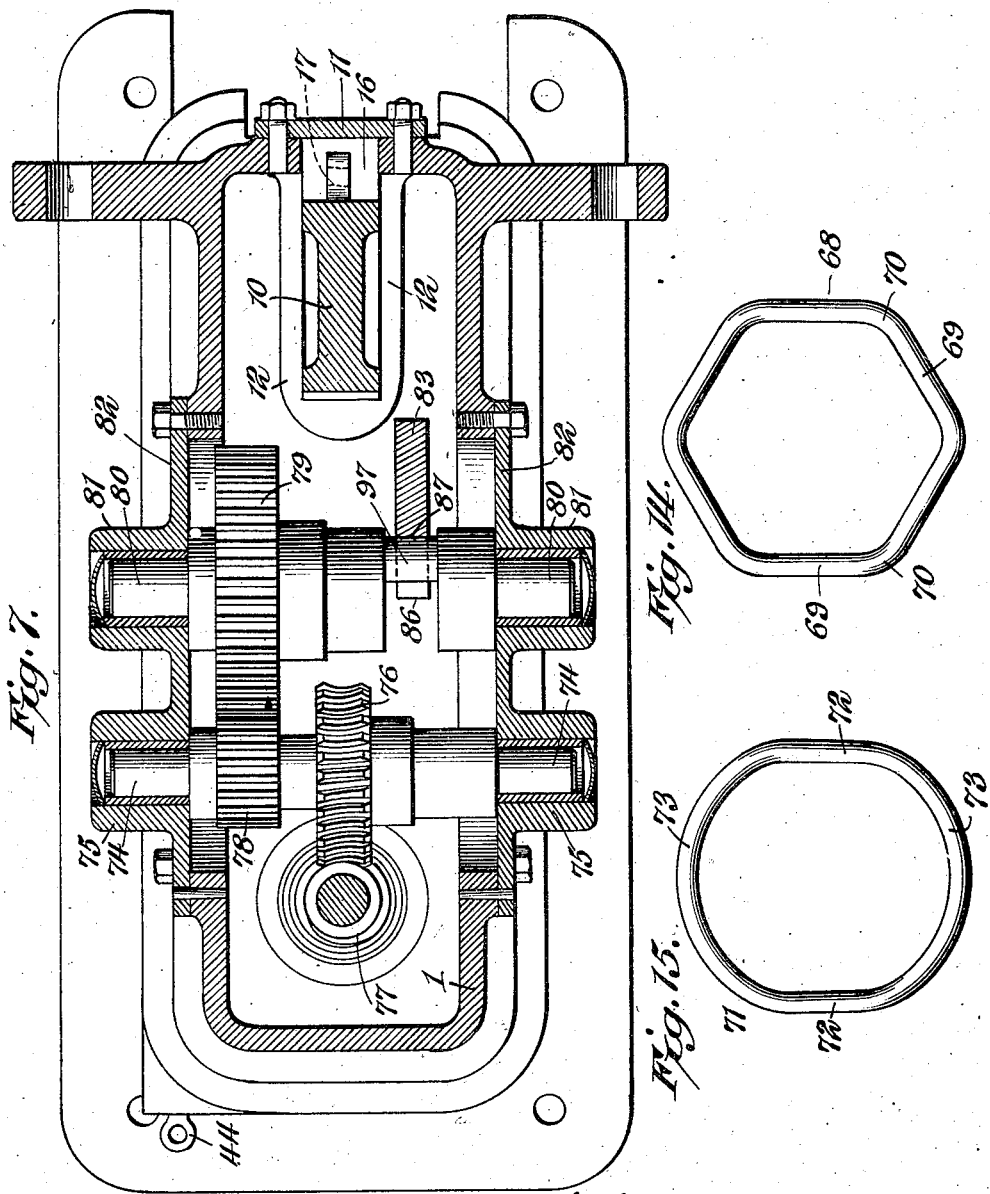

Feb. 15, 1927.
W. L. EVANS
1,617,621
DEVICE FOR MAKING RING JOINTS
Filed Aug. 25 1925 6 Sheets-Sheet 6
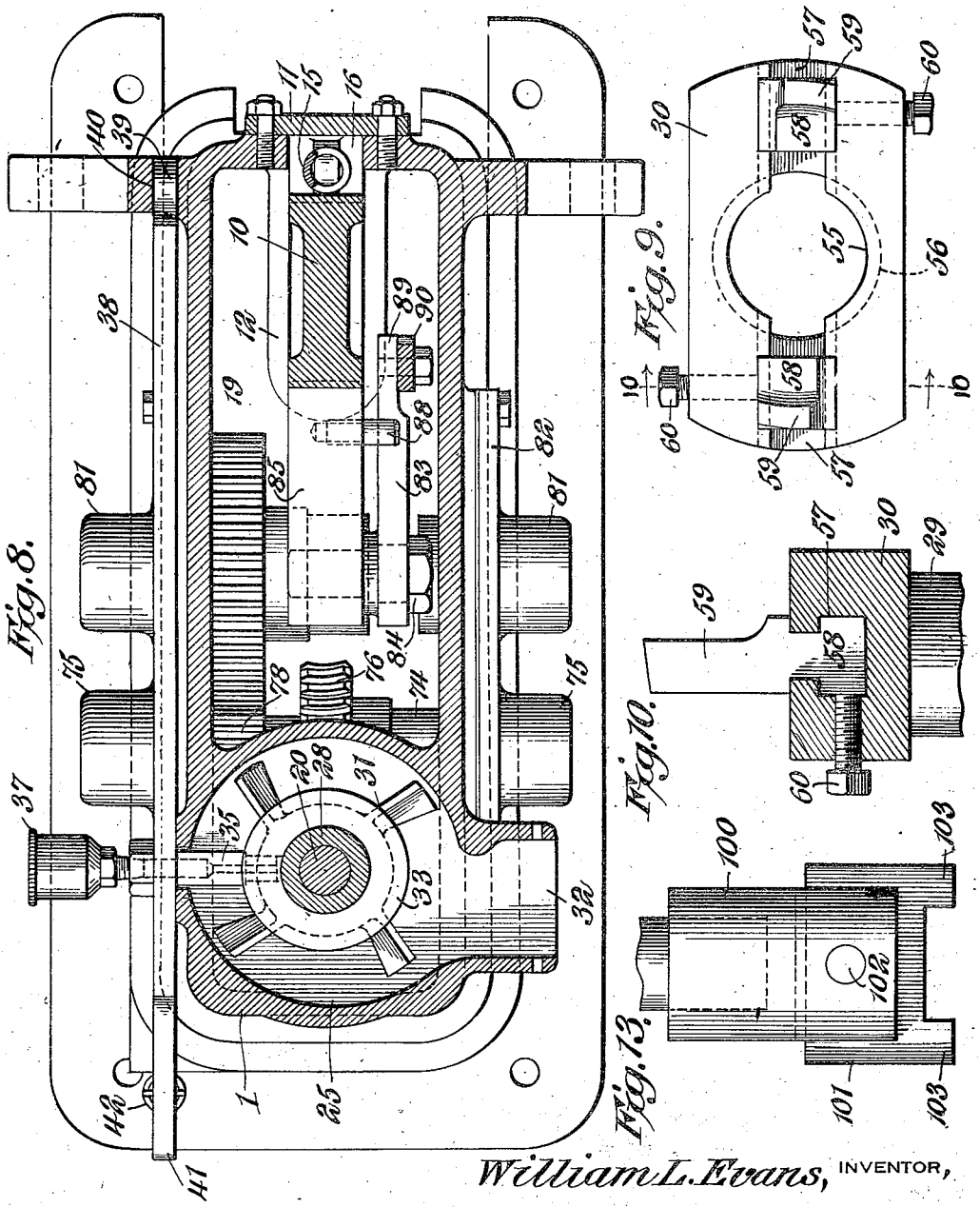
William L. Evans, INVENTOR,
WITNESSES
BY
ATTORNEY Patented Feb. 15, 1927.

1,617,621

UNITED STATES PATENT OFFICE.

REISSUED

WILLIAM L. EVANS, OF WASHINGTON, INDIANA.

DEVICE FOR MAKING RING JOINTS.

Application filed August 25, 1925. Serial No. 52,444.

This invention relates to devices for joining trim, molding, or other material, by what is known as a ring joint. In making this type of joint, the pieces to be joined are first cut in the proper form, and are then placed in their proper relative positions while a channel or groove is cut in their rear faces in such a manner as to form a continuous circular channel when the pieces are joined. A ring is then forced into the channel to complete the joint, and this ring is of such a size and shape that it will exert a forceful gripping action against the inner wall of the channel and hold the joint tightly together.

Important objects of the invention are to provide improved means for holding the pieces while the channel is being cut, to provide improved means for cutting said channel, and to provide improved means for expanding the ring and forcing it with great pressure over the circular boss defined by the channel, thus forming a joint that is held together with great pressure, so that it will not open even when there is considerable shrinkage in the wood itself. The efficacy of the joint is also increased by using a ring of improved construction.

The specific construction of the invention, together with its objects and advantages, will be more fully explained in connection with the accompanying drawings, which illustrate the same in detail.

In the drawings:

Figure 1 is an elevation of the invention as viewed from the left-hand side.

Figure 2 is a front elevation thereof.

Figure 3 is a vertical transverse section taken on the line 3—3 of Figure 1.

Figure 4 is a plan view of the machine.

Figure 5 is a bottom plan view.

Figure 6 is a vertical longitudinal section looking toward the left-hand side of the machine.

Figure 7 is a section taken substantially on the line 7—7 of Figure 6.

Figure 8 is a section taken on the line 8—8 of Figure 6.

Figure 9 is a plan view of the cutter.

Figure 10 is a section taken on the line 10—10 of Figure 9.

Figure 11 is a detail sectional view showing the position of the work engaging elements at the beginning of the ring expanding operation.

Figure 12 shows the position of the parts after the ring has been forced to the bottom of the channel.

Figure 13 is a detail view of a modified form of presser foot for holding the work while the channel is being cut.

Figure 14 is a detail view of one form of ring.

Figure 15 is a detail view of another form of ring.

Figure 16 is a detail view of the completed joint.

The machine, to which the present invention relates, comprises a main frame 1 in the form of a housing, substantially rectangular in shape, and having a work table 2 at its upper end. Mounted for slidable adjustment on this table is a gage bracket 3, the form of which will depend upon the character of the joint to be formed. In the present instance, I have shown a bracket used for making corner joints, and having a right-angular seat 4, against which are held the ends of the pieces to be joined. A dog 5 is pivotally mounted on one side of the bracket, and is yieldably held by a spring 6, so that a notch 7, formed at its inner end, engages a stud 8 which is adjustably mounted in a slot 9 formed longitudinally of the table. It is preferred to use two of these studs when joining wide pieces, so that two rings may be used on each joint.

A vertical bar 10 is slidably mounted in the rear part of the frame. A removable plate 11 is provided, so that the bar may be assembled. The lower end of the bar is guided in a pocket or guideway 12 at the bottom of the frame, while the upper portion of the bar extends upwardly through a slot in the table 2, and is provided with a forwardly extending head 13 which overhangs the table, and in which a ram 14 is adapted to be adjustably mounted. The lower portion of the bar 10 has a rearwardly projecting lug 16, which bears against the inside of the plate 11, and is formed on its upper side with an eye 17. A coil spring 15 is connected at its lower end to the eye 17, and at its upper end to an eye bolt 18 adjustably mounted in the rear end of the table. The spring 15 is tensioned so as to hold the arm 10 normally in its uppermost position.

The intermediate portion of the frame 1 is formed with an oil reservoir 19 within which the power-driven mechanism operates. A vertical cutter shaft 20 is rotatably mounted in ball bearings 21 and 22 at the forward end of the frame. The bearings 21 are supported in a suitable cage 23 secured at the bottom of the reservoir 19. The bearings 22 are mounted in a cage 24 secured in the bottom of a housing 25, which is located beneath the front end of the table. Suitable grease cups 26 and 27 are provided for lubricating the ball bearings.

The upper end of the shaft 20 extends into the housing 25, and has a sleeve 28 splined thereon. The upper end of this sleeve is threaded, and is formed with a shoulder 29 against which a cutter head 30 is secured. A fan 31 is secured to the lower end of the sleeve 28, and, when the cutter is operating, is adapted to blow the shavings out through a hole 32 in the side of the frame. Between the fan 31 and the shoulder 29 is a collar 33, within which the sleeve rotates. Above this collar is an annular wear plate 34 on which the sleeve is supported.

A pin 35 is secured to the collar 33, and projects through a vertical slot 36 formed in the side of the housing. This pin is hollow, and has a grease cup 37 at its outer end, by which grease may be supplied for lubricating the sleeve bearing. A lever 38 is pivotally mounted on the pin 35, and the rear end of this lever is formed with a circular head 39, which is loosely mounted in a recess 40 near the rear side of the frame. The front end 41 of the lever 38 projects from the front side of the frame, and is connected by a coil spring 42 to an eye bolt 43, which is adjustably mounted in a lug 44 formed on the base of the frame. The spring 42 is tensioned so that the front end of the lever is normally held in its lowermost position so that the cutter is within the housing 25. A laterally projecting pivot stud 45 is secured to the lever 38 between the pin 35 and the head 39, and a link 46 is pivotally connected at its lower end to this stud. The upper end of the link 46 is provided with a longitudinal slot 47, which receives a pivot stud 48 connected to the rear end of a hand lever 49, which is fulcrumed on a stud 50 projecting from the upper end of the bar 10.

The work 51, which, in the present instance, consists of two pieces cut to form a corner joint, is placed on the table against the seat 4, and while it is held in that position the constantly rotating cutter is raised to cut the circular channel 52. In performing this operation, the hand lever 49 is pulled forwardly. The first effect of this action is to lower the head 13, while the hand lever 49 swings about the stud 48 as a center, until the ram 14 engages the upper face of the work 51 and clamps the latter in position. As soon as a predetermined pressure is exerted upon the face of the work, further movement of the hand lever 49 causes the latter to swing about the stud 50 as a pivot, raising the link 46, and causing the front end of the lever 38 to swing upwardly, and to raise the cutter 30 into contact with the under face of the work. The height to which the cutter may be raised, and consequently the depth to which the channel 52 may be cut is limited by a stop 53, which is adjustably mounted on a threaded pin 54 extending downwardly from the front portion of the table, the stop being in the path of the front end 41 of the lever.

Any suitable form of cutter may be used. In the form which is shown in detail in Figures 9 and 10, the head 30 is formed with a cylindrical bore 55 for receiving the cylindrical end of the cutter shaft 20, and has an enlarged internally threaded portion 56 adapted to be secured to the upper end of the sleeve 28. The head is elongated, and is formed with an under-cut channel 57 extending diametrically from each side of the bore 55. In this channel are mounted opposed cutting elements 58, which are formed with upwardly projecting cutting teeth 59. Set screws 60 are provided for adjustably securing the cutting elements, so that a circular channel of any desired diameter may be cut. By setting the individual cutting teeth at different distances from the center, the cutter may also be used for cutting out circular wooden rings of the proper size to fit into the channel 52 to cover the ring which holds the joint together.

For driving the cutter shaft 20, the latter has a pulley 61 secured to its lower end, and connected by a belt 62 to a pulley 63 mounted on the shaft of a motor 64, which is secured by bolts 65 to the rear side of the frame. The bolts 65 may be adjusted longitudinally to adjust the tension of the belt.

In order to support the work 51 firmly while the circular channel is being cut, a flat ring 66 is seated on a shoulder 67 surrounding the opening in the table through which the cutter is projected. A number of these flat rings may be provided with openings corresponding in size to the diameters of the channels which are to be cut. The stop 53 is set so that a channel may be cut slightly more than half way through the wood, so that when the ring is seated in the bottom of the channel, pressure is exerted against the inner wall of the channel in a plane substantially midway between the faces of the wood.

The rings to be used in making the joints may be made in a variety of forms. The ring 68, shown in Figures 14 and 16, is polygonal in shape, having a number of sides 69 which are sustantially straight before the ring is applied, and which are connected by rounded corners 70. This ring is made of such a size that its apothem before the ring is applied is somewhat less than the radius of the boss formed within the circular channel 62. When the ring is forced into the channel, therefore, the mid-points of the sides 69 are forced outwardly, while the corners 70 are drawn inwardly and the ring approaches the form of a true circle.

The ring 71, illustrated in Figure 15, is formed with two opposed sides 72, substantially straight, connected by arcuate portions 73. When the ring is made in this shape, its size is such that in forcing it into the channel, the mid-points of the sides 72 are forced outwardly, while the arcuate portions 73 are drawn inwardly and elongated, so that the ring, when applied, approaches the shape of a true circle, and the mid-points of both the straight sides and the arcuate portions forcibly grip the inner wall of the channel, and hold the joint together with great pressure. When the ring is applied an imperforate plate 66ª is used in place of the ring 66.

The mechanism for applying the rings is driven from a train of gearing, which includes a transverse shaft 74 mounted in bearings 75, and having a worm gear 76 secured thereon and driven by a worm 77, which is secured on the cutter shaft 20. A pinion 78 is also secured on the shaft 74, and meshes with a spur gear 79 secured on another transverse shaft 80 which is journaled in bearings 81. The bearings 75 and 81 are disposed in side plates 82, which are securely bolted to the sides of the frame to cover openings which are provided in the frame for convenience in assembling the mechanism. Suitable gaskets and packing are provided for all removable and moving parts to prevent leakage of oil from the reservoir 19.

The shafts 74 and 80 rotate idly during the operation of cutting the circular channel, but are operatively connected to the bar 10, so as to force the head 13 and ram 14 downwardly with great pressure when the ring is being forced into the channel to complete the joint. The mechanism for effecting this connection comprises a dog 83, pivotally mounted at 84 to an arm 85, which projects forwardly from the bar 10. This dog terminates in a flat nose 86, above which is a notch 87. This notch, when the dog is moved into proper position, is adapted to be engaged by a crank 97 formed in the shaft 80, and to be drawn downwardly thereby, thus forcibly drawing the bar 10 downwardly. The dog is normally held in its uppermost position, as shown in Figure 6, out of the path of the crank 97 with its back resting against a stop pin 88, which is secured in the side of the arm 85. The upper face of the arm 85 normally engages the under side of the table to limit the upward movement of the bar 10 under the influence of the spring 15. The dog is formed with a rearwardly projecting lug 89 to which is pivotally connected the lower end of a link 90. The upper end of the link 90 is pivotally connected at 91 to a hand lever 92, which is fulcrumed on a stud 93 located on the right-hand side of the bar 10 substantially in alinement with the stud 50 on the left-hand side. The rear or lower end of the lever 92 carries a pivot stud 94 to which the upper end of a link 95 is pivoted. The lower end of the link 95 is turned laterally, as indicated at 96, and engages the under side of the table.

After the channel has been cut in the work 51, the latter is turned over to the position shown in Figures 11 and 12. The lever 92 is then pulled forwardly about its pivot 93, thus pulling upwardly on the link 95. Since the link is prevented from moving upwardly by the engagement of its end 96 with the table, the pivot stud 94 acts as a fulcrum, and the bar 10 is moved downwardly until the ram 14 meets with a resistance. By this time, however, the dog 83 has been lowered sufficiently so that the crank 97 engages the notch 87, and pulls the dog and consequently the bar 10 downwardly with great force until the nose 86 engages a lug 98 formed on the bottom of the frame and the dog is disengaged from the crank. The slot 47 in the link 46 permits the bar 10 to move downwardly without affecting the relative position of the hand lever 49.

When the work is placed underneath the ram 14 preparatory to applying the ring, a steel block 99 is placed upon the surface of the work within the channel 52. This block is in the shape of a frustum of a cone with its base of slightly less diameter than that of the boss formed within the circular channel. The ring 68 is placed upon the block, as shown in Figure 11, and when the ram 14 is forced downwardly with great pressure by the mechanism above described, the ring is expanded and forced to the bottom of the channel 52, and the tendency of the ring to resume its original shape holds the joint with tremendous pressure. The ram 14 is so adjusted that the ring will have been forced to the bottom of the channel when the dog strikes the lug 98 and is disengaged from its crank. If by any chance, the ram should be set too low, so that the crank can not make its revolution, an upward pull on the lever 92 will release the dog, and the ram may then be set higher.

As explained above, the ram 14 may be used for engaging the face of the material to hold it on the table while the channel is being cut, and after the work has been turned over may also be used for forcing the ring over the block 99 into the channel. In joining molding, however, or other material where the thickness is uneven, a special attachment may be used for holding the same while the channel is being cut. Such an attachment is shown in Figure 13, and includes a cylindrical member 100, having a head 101 pivotally connected thereto as at 102, and having feet 103 projecting from its lower face. Thus, the head 101 will automatically adjust itself to the varying thickness of the material.

It will, of course, be understood that various other attachments may be used on the head 13 and on the cutter shaft 20, depending upon the nature of the work to be performed. It is also apparent that various modifications may be made in the detailed construction of the various parts, and in the relative arrangement thereof without departing materially from the essential features of the invention. It is my purpose, therefore, to include all such modifications within the scope of the appended claims.

What is claimed is:

1. In a machine of the class described, the combination of a table, a vertically movable bar having a head overhanging the table, a lever pivoted on the bar, a link pivotally connected to the lever, a fixed abutment engageable by the link when the lever is rocked, whereby to force the bar and head downwardly, a power-driven shaft, means for temporarily connecting said shaft to the bar to forcibly urge the latter downwardly independently of the movement of said lever, a second lever, and means connecting the second lever to said first-mentioned means to establish the temporary connection between the shaft and the bar when the said second lever is rocked.

2. In a machine of the class described, the combination of a table, a vertically movable bar having a head overhanging the table, a lever pivoted on the bar, means connected with said lever for moving the bar downwardly when said lever is rocked about its pivot, a power driven shaft having a crank, a dog pivotally connected to the bar and having a notch therein, said dog being so arranged that it may be swung to bring the notch into position to be engaged by the crank on the downward portion of its movement, a second lever pivoted to the bar, and means operable by said second lever to establish the connection between the dog and the crank so as to forcibly urge the bar downwardly.

3. In a machine of the class described, the combination of a table, a vertically movable bar having a head overhanging the table, two levers pivotally connected to the bar, means connected to each lever for initially moving the bar downwardly when said lever is rocked while leaving the other lever in the same position relative to the bar, a vertical shaft having a cutter thereon, a second shaft, means operable by a further movement of one lever to raise the cutter shaft, and means operable by a further movement of the other lever to connect the second shaft to the bar and forcibly urge the latter farther downwardly.

4. In a machine of the class described, the combination of a table, a vertically movable bar having a head overhanging the table, a lever pivoted on the bar, means connected with said lever for initially moving the bar and head downwardly to clamp the work when the lever is rocked about its pivot, a constantly driven shaft, a cutter carried thereby, and means connected with the lever and operable upon further movement thereof in the same direction to move the shaft so that the cutter will operate on the work.

5. In a machine of the class described, the combination of a table, a vertically movable bar having a head overhanging the table, a power-driven shaft having a crank, a member connected to said bar and normally out of the path of the crank, a lever pivoted on said bar, and means connecting said member to the lever and operable by a rocking movement of the latter to shift said member into the path of the crank so as to be engaged by said crank upon its downward movement to forcibly move the bar and head downwardly.

6. In a machine of the class described, the combination of a table, a vertically movable bar having a head overhanging the table, a power-driven shaft having a crank, a member connected to said bar and normally out of the path of the crank, a lever pivoted on said bar, and means connecting said member to the lever and operable by a rocking movement of the latter to shift said member into the path of the crank so as to be engaged by said crank upon its downward movement to forcibly move the bar and head downwardly, and means for keeping said member out of engagement with the crank so as to release the bar and head to permit them to resume their original positions as the crank reaches the lowest point in its movement.

7. In a machine of the class described, the combination of a table, a vertically movable bar having a head overhanging the table, a power-driven shaft having a crank, a member connected to said bar and normally out of the path of said crank, a lever pivoted on said bar, means connected with said lever and operable by the movement of said lever about its pivot for initially lowering the bar and at the same time shifting said member into the path of the crank so as to be engaged by said crank upon its downward movement, whereby to forcibly lower the bar farther.

8. In a machine of the class described, the combination of a frame, a member mounted for rectilinear movement therein, a lever pivoted to said member, a link having one end pivotally connected to one end of said lever, a second lever intermediately pivoted to the other end of said link, said frame having a pocket in which one end of the second lever is loosely mounted, a second member guided for rectilinear movement in the frame and connected to the second lever on the other side of the connection between the latter and the link, and resilient means resisting movement of the second lever, whereby a movement of the first lever about its pivot causes the first of said members to be actuated with a predetermined force before the second member begins to move.

9. In a machine of the class described, the combination of a frame, a downwardly movable work clamping member mounted therein, a lever pivoted to said work clamping member, a link pivoted at its upper end to one end of said lever, a second lever intermediately pivoted to the lower end of said link, said frame having a pocket in which one end of the second lever is loosely mounted, an upwardly movable cutting member guided in the frame and connected to the second lever on the other side of the connection between the latter and the link, and resilient means resisting movement of the second lever, whereby a movement of the first lever about its pivot causes the work clamping member to be moved downwardly with a predetermined force before the cutting member begins to move upwardly.

In testimony, that I claim the foregoing as my own, I have hereto affixed my signature.

WILLIAM L. EVANS.